(12) United States Patent
Kolb et al.

(10) Patent No.: US 9,115,781 B2
(45) Date of Patent: Aug. 25, 2015

(54) DEVICE FOR SPRINGING A MASS, AND METHOD FOR ADJUSTING AND/OR OPERATING A FLUID SPRING

(75) Inventors: Jens Kolb, Koenigstein (DE); Erwin Haller, Birgland (DE)

(73) Assignee: GRAMMAR AG, Amberg (DE)

( * ) Notice: Subject to any disclaimer, the term of this patent is extended or adjusted under 35 U.S.C. 154(b) by 633 days.

(21) Appl. No.: 12/691,114

(22) Filed: Jan. 21, 2010

(65) Prior Publication Data

US 2010/0181708 A1    Jul. 22, 2010

(30) Foreign Application Priority Data

Jan. 21, 2009    (DE) .................. 10 2009 005 381

(51) Int. Cl.
| | |
|---|---|
| *B60G 17/04* | (2006.01) |
| *F16F 15/027* | (2006.01) |
| *B60G 99/00* | (2010.01) |
| *B60N 2/50* | (2006.01) |
| *B60N 2/52* | (2006.01) |
| *F16F 9/04* | (2006.01) |

(52) U.S. Cl.
CPC .......... *F16F 15/027* (2013.01); *B60G 17/0416* (2013.01); *B60G 99/002* (2013.01); *B60N 2/508* (2013.01); *B60N 2/52* (2013.01); *B60N 2/522* (2013.01); *F16F 9/04* (2013.01); *B60G 2202/152* (2013.01); *B60G 2204/162* (2013.01); *B60G 2300/08* (2013.01); *B60G 2500/206* (2013.01)

(58) Field of Classification Search
CPC ............ B60G 17/052; B60G 17/0523; B60G 17/0525; B60G 17/0152; B60G 17/0155

USPC ........ 267/64.11, 64.25, 64.28, 117, 131, 136, 267/218, 64.16, 3; 248/562, 566, 631, 674, 248/575; 60/408–410; 280/5.515, 6.158, 280/124.157; 188/195
IPC ............................................. B60G 17/04,17/52
See application file for complete search history.

(56) References Cited

U.S. PATENT DOCUMENTS

| | | | | |
|---|---|---|---|---|
| 1,990,517 | A | * | 2/1935 | Bedford et al. ............ 280/6.158 |
| 2,687,311 | A | * | 8/1954 | Nallinger ................... 280/6.158 |
| 2,973,968 | A | | 3/1961 | Behles |
| 3,042,392 | A | | 7/1962 | Schmitz et al. |
| 3,466,055 | A | | 9/1969 | Keijzer |
| 3,552,763 | A | | 1/1971 | Yasin |
| 3,762,769 | A | | 10/1973 | Poschl |
| 3,836,166 | A | * | 9/1974 | Bainbridge et al. ....... 280/5.508 |
| 3,938,770 | A | | 2/1976 | Turner et al. |

(Continued)

FOREIGN PATENT DOCUMENTS

| | | |
|---|---|---|
| DE | 452315 | 11/1927 |
| DE | 2604809 | 8/1977 |

(Continued)

*Primary Examiner* — Bradley King
*Assistant Examiner* — Stephen Bowes
(74) *Attorney, Agent, or Firm* — Lowe Graham Jones PLLC

(57) ABSTRACT

A device for springing a mass including a fluid spring and a frame, in which the fluid spring is arranged between the mass and the frame in such a way that the mass is mounted on the frame in a sprung and/or damped manner. An add-on-fluid volume device for providing an additional fluid volume for the fluid spring includes at least two fluid volume chambers that can be fluidically connected to one another and which have a common, displaceable chamber wall.

19 Claims, 4 Drawing Sheets

(56) References Cited

U.S. PATENT DOCUMENTS

| | | | |
|---|---|---|---|
| 3,966,223 A | 6/1976 | Carr | |
| 4,052,088 A | 10/1977 | Nicholls | |
| 4,159,105 A | 6/1979 | Vander Laan et al. | |
| 4,193,629 A | 3/1980 | Merkle | |
| 4,286,765 A | 9/1981 | Delgleize et al. | |
| 4,418,955 A | 12/1983 | Muncke et al. | |
| 4,451,079 A | 5/1984 | Takahashi | |
| 4,463,839 A | 8/1984 | Ashiba | |
| 4,469,010 A | 9/1984 | Skover, Jr. et al. | |
| 4,600,215 A | 7/1986 | Kuroki et al. | |
| 4,634,142 A | 1/1987 | Woods et al. | |
| 4,645,042 A | 2/1987 | Inoue et al. | |
| 4,645,169 A | 2/1987 | Mischer | |
| 4,684,100 A | 8/1987 | Grassl | |
| 4,700,971 A | 10/1987 | Doi et al. | |
| 4,726,604 A | 2/1988 | Asami et al. | |
| 4,729,539 A | 3/1988 | Nagata | |
| 4,729,580 A | 3/1988 | Buma et al. | |
| 4,733,847 A | 3/1988 | Grassl | |
| 4,743,000 A * | 5/1988 | Karnopp | 267/218 |
| 4,793,583 A * | 12/1988 | Bergacker et al. | 248/550 |
| 4,822,094 A | 4/1989 | Oldfather et al. | |
| 4,844,428 A * | 7/1989 | Margolis et al. | 267/64.21 |
| 4,852,863 A | 8/1989 | Breitenbacher et al. | |
| 4,941,641 A | 7/1990 | Granzow et al. | |
| 4,946,145 A | 8/1990 | Kurabe | |
| 5,058,852 A | 10/1991 | Meier et al. | |
| 5,125,631 A | 6/1992 | Brodersen et al. | |
| 5,133,575 A | 7/1992 | Zantinge et al. | |
| 5,169,129 A | 12/1992 | Hoffman | |
| 5,176,355 A | 1/1993 | Carter | |
| 5,217,210 A | 6/1993 | Schützner | |
| 5,234,203 A | 8/1993 | Smith | |
| 5,255,935 A | 10/1993 | Imani | |
| 5,324,069 A | 6/1994 | Ogawa | |
| 5,413,316 A | 5/1995 | Easter | |
| 5,425,436 A | 6/1995 | Teramura et al. | |
| 5,428,533 A | 6/1995 | Ogawa | |
| 5,450,322 A | 9/1995 | Tanaka et al. | |
| 5,533,703 A | 7/1996 | Grassl et al. | |
| 5,536,059 A | 7/1996 | Amirouche | |
| 5,555,501 A | 9/1996 | Furihata et al. | |
| 5,558,398 A | 9/1996 | Santos | |
| 5,564,520 A | 10/1996 | Forsythe | |
| 5,603,387 A | 2/1997 | Beard et al. | |
| 5,623,410 A | 4/1997 | Furihata et al. | |
| 5,735,509 A | 4/1998 | Gryp et al. | |
| 5,941,920 A | 8/1999 | Schubert | |
| 6,000,703 A | 12/1999 | Schubert et al. | |
| 6,029,764 A | 2/2000 | Schubert | |
| 6,067,491 A | 5/2000 | Takahashi | |
| 6,078,791 A | 6/2000 | Tuttle et al. | |
| 6,082,715 A | 7/2000 | Vandermolen | |
| 6,314,353 B1 | 11/2001 | Ohsaku et al. | |
| 6,371,456 B1 | 4/2002 | Ritchie et al. | |
| 6,490,930 B1 | 12/2002 | Ohkubo et al. | |
| 6,616,116 B1 | 9/2003 | Rochau et al. | |
| 6,688,626 B2 * | 2/2004 | Felsl et al. | 280/275 |
| 7,152,839 B2 | 12/2006 | Mullinix et al. | |
| 7,712,836 B2 | 5/2010 | Deml | |
| 2001/0044685 A1 | 11/2001 | Schubert | |
| 2003/0015830 A1 | 1/2003 | Miller et al. | |
| 2003/0140487 A1 | 7/2003 | Plettner | |
| 2004/0094912 A1 | 5/2004 | Niwa et al. | |
| 2006/0185434 A1 | 8/2006 | Bernhagen | |
| 2007/0236071 A1 | 10/2007 | Fujita et al. | |
| 2008/0156602 A1 | 7/2008 | Hiemenz et al. | |
| 2008/0197684 A1 | 8/2008 | Ott et al. | |
| 2009/0026816 A1 | 1/2009 | Haller | |
| 2009/0134595 A1 | 5/2009 | Haller et al. | |
| 2009/0272871 A1 | 11/2009 | Haller | |
| 2010/0102493 A1 | 4/2010 | Deml et al. | |
| 2010/0117428 A1 | 5/2010 | Deml et al. | |
| 2010/0181708 A1 | 7/2010 | Kolb et al. | |

FOREIGN PATENT DOCUMENTS

| | | | |
|---|---|---|---|
| DE | 8104855 | 8/1981 | |
| DE | 220674 | 4/1985 | |
| DE | 3517503 | 11/1986 | |
| DE | 4211628 | 10/1993 | |
| DE | 4335199 | 5/1995 | |
| DE | 19803750 | 8/1998 | |
| DE | 19714576 | 10/1998 | |
| DE | 19902224 | 4/2000 | |
| DE | 19848821 | 5/2000 | |
| DE | 20214583 | 1/2003 | |
| DE | 10317134 | 6/2004 | |
| DE | 10330198 | 2/2005 | |
| DE | 102005023090 | 11/2006 | |
| DE | 102005043575 | 3/2007 | |
| DE | 102005044214 | 3/2007 | |
| EP | 0089794 | 9/1983 | |
| EP | 0563948 | 4/1993 | |
| EP | 0938999 | 9/1999 | |
| EP | 1050749 | 11/2000 | |
| EP | 1188608 | 3/2002 | |
| EP | 1352595 | 10/2003 | |
| EP | 1484205 | 12/2004 | |
| EP | 1657471 | 5/2006 | |
| EP | 1693655 | 8/2006 | |
| EP | 1844979 | 10/2007 | |
| FR | 2879740 | 6/2006 | |
| JP | 60185615 A * | 9/1985 | B60G 17/00 |
| JP | 61075008 | 4/1986 | |
| JP | 63046911 A * | 2/1988 | B60G 17/02 |
| JP | 63265715 A * | 11/1988 | B60G 17/10 |
| JP | 63269711 A * | 11/1988 | B60G 17/00 |
| JP | 01156121 A * | 6/1989 | B60G 17/00 |
| JP | 2133215 | 5/1990 | |
| JP | 2197470 | 8/1990 | |
| JP | 3200485 | 9/1991 | |
| JP | 2004058695 | 2/2004 | |
| JP | 2004185476 | 7/2004 | |
| KR | 20020090377 | 12/2002 | |
| WO | 8703256 | 6/1987 | |
| WO | 8809270 | 12/1988 | |
| WO | 8912766 | 12/1989 | |
| WO | WO 9418020 A1 * | 8/1994 | B60G 17/015 |
| WO | 0035708 | 6/2000 | |
| WO | 0043952 | 7/2000 | |
| WO | 0058125 | 10/2000 | |
| WO | 02068229 | 9/2002 | |
| WO | 2004057528 | 7/2004 | |
| WO | 2005008578 | 1/2005 | |
| WO | 2005022690 | 3/2005 | |
| WO | 2005095153 | 10/2005 | |
| WO | 2005102112 | 11/2005 | |

* cited by examiner

DEVICE FOR SPRINGING A MASS, AND METHOD FOR ADJUSTING AND/OR OPERATING A FLUID SPRING

PRIORITY CLAIM

This application claims the benefit of German Application Serial No. 10 2009 005 381.6 filed Jan. 21, 2009, contents of which are incorporated herein.

FIELD OF THE INVENTION

The invention relates to a device for springing a mass comprising a fluid spring and a frame, in which the fluid spring is arranged between the mass and the frame in such a way that the mass is mounted on the frame in a sprung and/or damped manner. The invention also relates to a method for adjusting and/or operating a fluid spring for springing a mass relative to a frame, in particular for adjusting and/or operating a fluid spring of such a device for springing a mass.

BACKGROUND OF THE INVENTION

Generic devices and methods are already well known from the prior art. In particular, such devices exist as suspension systems for sprung vehicle seats especially on utility vehicles, heavy goods vehicles and the like. Such sprung vehicle seats are typically mounted on a floor or on a floor panel of the respective motor vehicle, wherein the floor or the motor vehicle can be regarded as the fixed frame. A seat device of the vehicle seat and/or a person sitting thereon can be regarded as the mass to be sprung, wherein often an air spring is provided for springing such a mass relative to the frame. This air spring may in this case be integrated in a scissors-type control system of the vehicle seat, which can ensure a reliable guidance, in particular a guided vertical upward and downward movement of the seat device. The scissors-type control system may additionally be equipped with a damper in order additionally to be able to damp for example particularly severe vertical movements.

An example of a generic configuration is known from DE 10 2004 054 325 B3. In the configuration proposed therein, the suspension comfort is said to be improved by the fact that the height of the seat surface relative to the vehicle floor and the acceleration of the seat surface in the vertical direction are detected. Based on the corresponding measured data, the pressure in the air spring is then varied. In other words, it is proposed in DE 10 2004 054 325 B3 to vary the quantity of air supplied to the air spring as a function of the vertical acceleration and also the height of the driver's seat surface above the vehicle floor.

DD 220 674 A1 discloses an active, electrohydraulic vibration damper which, connected in parallel with a spring, is intended to have a damping effect on a vehicle seat.

DD 223 835 A1 discloses a controller for a hybrid anti-vibration system with feedback of an absolute speed of an object, which can be used for seats and in which account is taken of the acceleration of the seat.

Furthermore, DE 601 21 688 T2 discloses an active seat suspension system for a seat, which is supported by a scissors-type system above a seat substructure. A hydraulic piston and an air cushion are provided between the seat and the seat substructure. The quantity of air in the air cushion, which is of constant volume, is controlled by a compressor and by a vent. The configuration comprises an acceleration sensor and also a seat position sensor, the measured values of which are taken into account by an electronic control unit (ECU) when actuating the compressor and the vent.

In addition to the above-mentioned use examples with regard to vehicle seats, such suspension systems also occur in other technical embodiments, for example on a wheel suspension of vehicles, such as in particular motor vehicles.

SUMMARY OF THE INVENTION

The present invention is directed to improvements to generic suspension systems so that the suspension system can in particular be adapted particularly quickly to changing general conditions. This is achieved by a device for springing a mass comprising a fluid spring and a frame in which the fluid spring is arranged between the mass and the frame in such a way that the mass is mounted on the frame in a sprung and/or damped manner, and the device is characterized by an add-on-fluid volume controller (i.e., device providing a means for adding fluid volume) for providing an additional fluid volume for the fluid spring, wherein the add-on-fluid volume controller comprises at least two fluid volume chambers which can be fluidically connected to one another and which have a common, displaceable chamber wall.

The add-on-fluid volume controller preferably comprises two fluid volume chambers that can be fluidically connected to one another and which have a common, displaceable chamber wall, as a result of which in particular the fluid spring can be adjusted differently and operated in a particularly simple manner in design terms by means of a suitable pressure modulation with regard to the two fluid volume chambers.

Since the add-on-fluid volume controller has in particular more than one fluid volume chamber, the present fluid spring can be adapted more quickly to changing general conditions. The fluid spring can also be adjusted in a much more versatile manner if a first fluid volume chamber of the add-on-fluid volume controller and a further fluid volume chamber of the add-on-fluid volume controller are configured to be fluidically connected to one another.

The present invention is also directed to a method for adjusting and/or operating a fluid spring for springing a mass relative to a frame, in particular for adjusting and/or operating a fluid spring of the present device, in which the fluid spring is fluidically connected to a fluid volume chamber of an add-on-fluid volume controller, wherein, in order to adjust and/or operate the fluid spring, a first fluid volume chamber of the add-on-fluid volume controller and a further fluid volume chamber of the add-on-fluid volume controller are fluidically connected to one another or fluidically separated from one another.

Particularly if the fluid volume chambers are fluidically connected to one another, movement forces which may occur in connection with an adjustment and/or operation of the fluid spring can advantageously be reduced. In a preferred embodiment the fluid consists of a gas, ideally air, wherein the fluid spring can react particularly sensitively to changing general conditions, such as for example sudden upward or downward movements or rocking movements of a motor vehicle.

It will be understood that the fluid spring is fluidically connected to the add-on-fluid volume controller by means of a suitable fluid line, so that an additional fluid volume can be made available to the fluid spring from at least one of the fluid volume chambers of the add-on-fluid volume controller or can be drawn off from the fluid spring. Here, it may be provided in particular that pressure equalization between the fluid spring and at least one of the fluid volume chambers of the add-on-fluid volume controller may also take place via the fluid line. Preferably this fluid line comprises a shut-off valve so that the fluid spring can also if necessary be fluidically separated from the add-on-fluid volume controller.

An embodiment of the present invention comprising the fluid spring, the frame and the vibrating mass may itself form a suspension system of simple construction or may be integrated in a complex suspension system. Preferably, the device forms a structurally simple suspension system especially on a motor vehicle.

It is particularly advantageous if the mass comprises a movable part of a seat. In this case, the mass may be, for example, a seat device that can vibrate relative to the frame and on which optionally a vehicle driver has also sat.

As the frame, there may be provided for example in the present case a floor panel of a vehicle body, to which for example a scissors-type control system of a vehicle seat is attached. The frame can thus be regarded as the unsprung mass of the device, in contrast to the sprung mass of the device, for example in the form of the vibrating seat device of the vehicle seat.

Another advantageous embodiment provides that the fluid spring is coupled to a scissors-type control arm of a seat by means of which a well-guided upward or downward movement of a seat device can be achieved in a structurally simple manner.

In another embodiment, the mass may alternatively also be a body component of a vehicle, which may advantageously be sprung. By way of example, the mass is in this case a vehicle cab of a utility vehicle that is intended to be mounted in a sprung manner on a chassis of the utility vehicle.

One preferred variant embodiment provides that at least two fluid volume chambers of the add-on-fluid volume controller are arranged such that they can be fluidically connected to one another via a pressure equalizing valve. By means of a suitable pressure equalizing valve, a fluid connection between the fluid volume chambers of the add-on-fluid volume controller can be either opened or closed depending on which fluid spring function is to be set on the device.

Further advantageous adjustment possibilities are achieved if at least two fluid volume chambers of the add-on-fluid volume controller are adjustable with regard to their fluid volume.

If at least two fluid volume chambers of the add-on-fluid volume controller have a common, displaceable chamber wall, a dual chamber system of particularly simple construction can be provided on the additional volume device. In particular, the two fluid volume chambers can be simultaneously varied and adjusted with regard to their chamber volume by means of a single displacement of the common chamber wall. If, for example, a first fluid volume chamber is reduced in size by displacing the chamber wall, at the same time a second fluid volume chamber is increased in size if the chamber wall separates the two fluid volume chambers.

It is thus advantageous if at least two fluid volume chambers of the add-on-fluid volume controller are separated by a piston that forms a common, displaceable chamber wall of the fluid volume chambers.

One variant embodiment which is particularly simple in this regard provides that the common, displaceable chamber wall is formed by a piston bottom of a cylinder, as a result of which a dual chamber system with regard to the add-on-fluid volume controller can be provided in a structurally very simple manner.

The piston bottom or the common, displaceable chamber wall can advantageously be displaced by a particularly low movement force if pressure equalization in the two fluid volume chambers has been carried out beforehand via the pressure equalizing valve. The present add-on-fluid volume controller which is equipped with more than one fluid volume chamber thus brings about a further significant advantage, since as a result the response of a suspension system can be further improved.

In this connection, it is advantageous if the add-on-fluid volume controller is embodied as a two-chamber cylinder with a controllable piston. As a result, the present add-on-fluid volume controller can be provided in a particularly simple manner with regard to its construction.

If the add-on-fluid volume controller comprises an actuator for adjusting a fluid volume of a fluid volume chamber, an adjustment or operation of the fluid spring can be further improved.

Such a fluid volume adjustment can be carried out particularly easily if the add-on-fluid volume controller comprises an actuator for displacing a common chamber wall of two fluid volume chambers of the add-on-fluid volume controller.

Preferably, the actuator can directly and actively displace the above-described common, displaceable chamber wall or the controllable piston within the add-on-fluid volume controller especially with regard to leveling a seat surface and/or with regard to reducing a vibration exposure of the seat surface.

This can be achieved much more easily if the same pressure conditions prevail in the corresponding fluid volume chambers. As a result, the common, displaceable chamber wall or the controllable piston can assume a floating position within the add-on-fluid volume controller, as a result of which on the one hand the power requirement of a servo motor can be reduced. On the other hand, the dynamics of adjustment or an adjustment speed can be considerably increased.

An alternative embodiment of the present invention comprises means for reducing a required movement force for moving a piston of the add-on-fluid volume controller. These means for reducing the required movement force may be formed in a particularly simple and reliable manner in construction terms by at least one further fluid volume chamber, as a result of which the common, displaceable chamber wall or the piston can be displaced with a lower movement force.

In this connection, one advantageous variant of the method provides that a required movement force of a piston of the add-on-fluid volume controller is reduced by pressure equalization within the fluid volume chambers of the add-on-fluid volume controller.

By means of an add-on-fluid volume controller constructed in this way, the present device can easily be constructed as a closed fluid system. In particular, it is provided in this case that the spring rate of the fluid spring can be adjusted by means of a corresponding fluid volume modulation on the add-on-fluid volume controller.

However, if it is necessary to provide additional fluid volume, it is also possible in the present case to use an open fluid system in which the quantity of fluid in the fluid system can be increased, for example, by means of a suitable pump device. The quantity of fluid can also be reduced by means of a drain device.

In an alternative embodiment the device is additionally equipped with a damper. This is advantageous in particular in the event of a failure of the fluid spring, since the vibrating mass can then still be damped at least by means of the damper. The damper may in this case be on the one hand hydraulically and on the other hand semi-actively or actively controlled.

Advantageously, the add-on-fluid volume controller can be fluidically connected in series with the fluid spring.

In yet an alternative embodiment, the device comprises position sensors and/or acceleration sensors. For example, a set seat height of the seat device can be determined by means of the position sensor. This is advantageous especially with regard to regulating a level of a seat device for example. The vibrations introduced from the frame can be determined by means of the acceleration sensor. This is advantageous in particular for reducing a vibration exposure of a seat device for example. Based on the data or characteristic operating values obtained by the sensors, the additional volume device can advantageously be controlled and/or adjusted accordingly.

Such sensors are particularly suitable for being able to determine at least one relevant characteristic operating value concerning the present device, on the basis of which in particular the add-on-fluid volume controller can be adjusted.

In yet another embodiment of the present invention the method provides that at least one characteristic operating value is determined on a suspension system of the fluid spring, and a fluid volume change at the fluid volume chambers of the add-on-fluid volume controller is carried out as a function of the determined at least one characteristic operating value.

Particularly for determining at least one characteristic operating value, advantageously a suitable detection and/or measurement device may be provided. However, suitable characteristic operating values may also be determined by calculation. By way of example, a relevant characteristic operating value can be determined as a function of an acceleration of the present sprung mass relative to the frame and/or as a function of a relative position of the mass relative to the frame.

By way of example, with regard to an embodiment as a vehicle seat, this corresponds to the relative position of the seat height in the vehicle if this is the vertical relative position, which is preferably the case. Correspondingly, the acceleration will preferably be the vertical acceleration of the seat device relative to the frame. In this preferred embodiment, the nominal volume of the add-on-fluid volume controller is determined as a function of this acceleration and this relative position and the nominal volume is controlled by means of a control device.

In one preferred embodiment—related both to the method and to the device—the fluid volume of the add-on-fluid volume controller can be regulated by a regulating device.

Furthermore, the device may be supplemented by a control device, by means of which in particular the add-on-fluid volume controller can be controlled or regulated as a function of a determined characteristic operating value.

In particular, however, the present device can advantageously be used not just with regard to a suspension system of a vehicle seat. Instead, it is also suitable for forming or supplementing other suspension systems, for example including with regard to a wheel suspension on vehicles, in particular motor vehicles, such as for example cars, heavy goods vehicles or utility vehicles.

Further advantages, aims and properties of the present invention will be explained on the basis of the following description of the appended drawing, in which there are shown by way of example different suspension systems comprising an add-on-fluid volume controller with at least two fluid volume chambers which can be fluidically connected to one another and which have a common, displaceable chamber wall. For the sake of clarity, repeated references can be omitted in individual figures for identical components or groups of components.

BRIEF DESCRIPTION OF THE DRAWINGS

Preferred and alternative examples of the present invention are described in detail below with reference to the following drawings.

DETAILED DESCRIPTION OF THE PREFERRED EMBODIMENT

Figure 1:
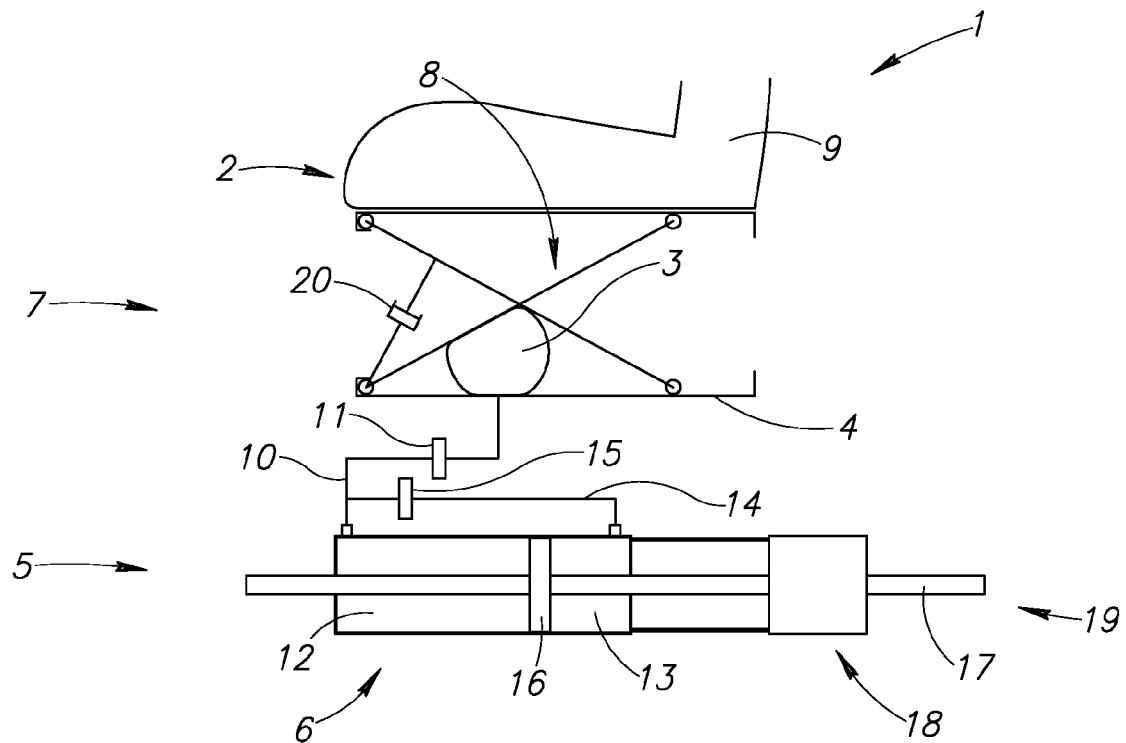
FIG. 1 schematically shows a view of a first exemplary embodiment of a device for springing a mass in the form of a seat device comprising a fluid spring in conjunction with a continuously adjustable add-on-fluid volume controller in a maximum comfort position.
Figure 2:
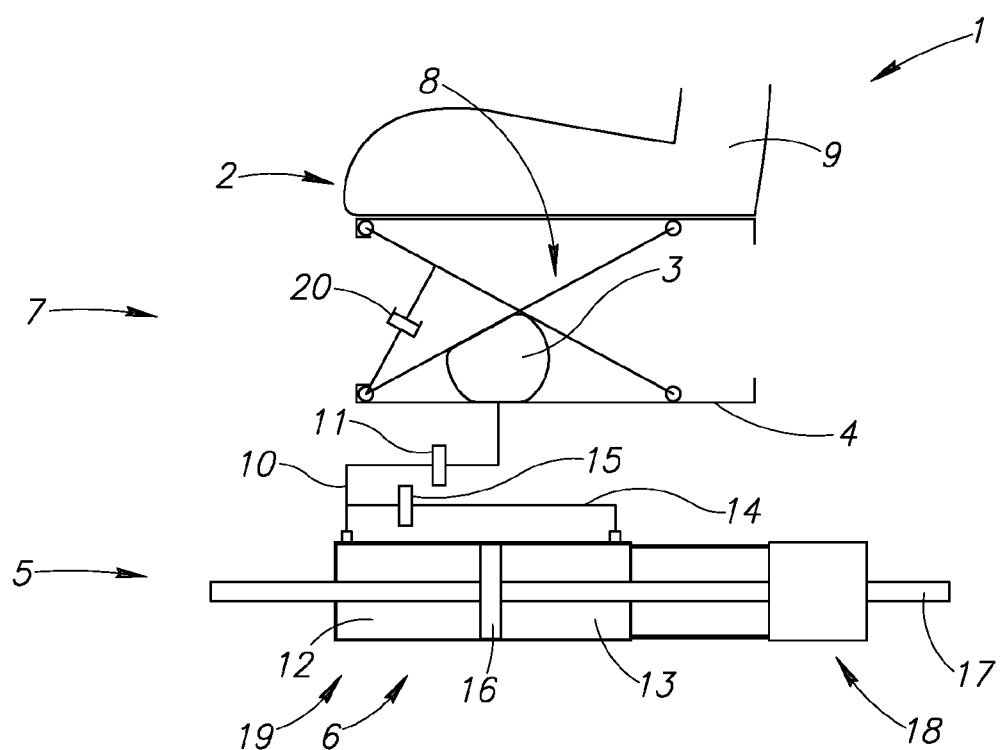
FIG. 2 schematically shows a further view of the first exemplary embodiment of FIG. 1 in a medium comfort position.
Figure 3:
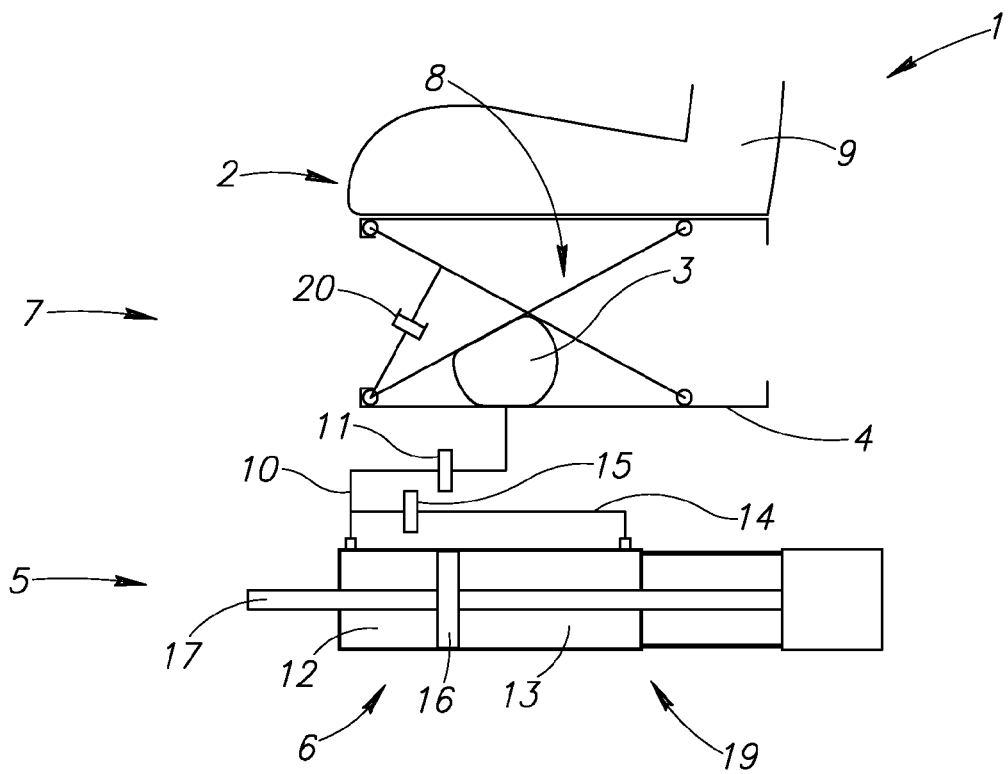
FIG. 3 schematically a further view of the first exemplary embodiment of FIG. 1 in a lower comfort position.

The device 1 shown in FIGS. 1-3 for springing a mass 2 comprises a fluid spring 3, a frame 4 and an add-on-fluid volume controller 5 for providing an additional fluid volume 6 for the fluid spring 3. By means of this add-on-fluid volume controller 5, the additional fluid volume 6 can be adjusted, as a result of which at least a certain range of spring stiffness or spring rate of the fluid spring 3 can be adapted to the respective operating parameters.

The device 1 forms on the whole a suspension system 7 comprising a scissors-type control system 8, by means of which a method for actively reducing a vibration exposure and for controlling the level in air-sprung drivers' seats can be carried out, namely, for example, for vertical vibration introductions. However, such a method can also be used for air-assisted longitudinal or lateral-horizontal suspensions, wherein in the present case the fluid spring 3 operates with air or compressed air. Accordingly, for the sake of simplicity, air is also used as the additional fluid volume 6.

In this first exemplary embodiment, the sprung mass 2 is a seat device 9 of a driver's seat, on which a person (not shown here) can sit, wherein the person is then regarded as an additional sprung mass. The frame 4 is configured here as a bodywork floor and can in the present case be regarded as the unsprung mass.

The fluid spring 2 is connected to the add-on-fluid volume controller 5 via a fluid line 10, wherein a shut-off valve 11 is arranged in the fluid line 10.

The add-on-fluid volume controller 5 comprises a first fluid volume chamber 12 and a second fluid volume chamber 13 that can be fluidically connected to one another via a suitable fluid connection 14 when a pressure equalizing valve 15 in the fluid connection 14 is opened.

The two fluid volume chambers 12, 13 are spatially separated from one another by a common, displaceable chamber wall 16. The common, displaceable chamber wall 16 here forms a piston bottom of a controllable piston 17, wherein the controllable piston 17 can be continuously driven by an actuator 18 in the form of an electric servo motor of the add-on-fluid volume controller 5.

The add-on-fluid volume controller 5 is thus embodied in a particularly simple manner in terms of construction as a two-chamber cylinder 19 with a controllable piston 17.

For basic damping of the suspension system 7, the device 1 also has a damper 20, wherein the damper 20 may be configured in a hydraulically and/or semi-actively and/or actively controlled manner.

Since the piston bottom of the controllable piston 17 is surrounded on both sides by a respective fluid volume chamber 12 and 13, the piston bottom can be acted upon on both sides by an essentially identical pressure when a pressure equalization with regard to the two fluid volume chambers 12 and 13 has taken place via the fluid connection 14 with the pressure equalizing valve 15 open. Due to this pressure equalization, a displacement of the controllable piston 17 by means of the actuator 18 can take place with much lower movement forces. The actuator 18 in particular can therefore be designed to be weaker with regard to its power and accordingly can be made smaller. This advantageously saves both space and costs.

In order to be able to set, for example, a desired height level of the seat device 9 by means of the device 1, air can additionally be supplied to the fluid spring 3 via the fluid line 10 with the shut-off valve 11 open, until the desired height level has been set. After the level has been set, the pressure equalizing valve 15 is closed again. Beforehand, pressure equilibrium has been established in the two fluid volume chambers 12 and 13 via the fluid connection 14 with the pressure equalizing valve 15 open, and then the pressure equalizing valve 15 is closed again.

The control movements of the piston 17 that are necessary in practical use in order to vary properties of the fluid spring 3 and for an active adjustment of the suspension now take place with a greatly reduced necessary movement force at the actuator 18, since the piston 17 can assume a substantially floating position due to the pressure equilibrium in the fluid volume chambers 12 and 13. As a result, the power output by the actuator 18 can be reduced and/or the dynamics of the present adjustment or the adjustment rate can advantageously be increased.

Another feature of the device 1 according to the invention lies in the fact that an adaptation of the suspension properties, such as the spring characteristic for example, can take place without an external air supply or air discharge. An adaptation or change of the spring characteristic can take place by varying the chamber volume of the first fluid volume chamber 12 and at the same time opening the pressure equalizing valve 15. The pressure equalizing valve 15 is then closed again and the pressure equilibrium in the two fluid volume chambers 12 and 13 is ensured.

A control of an adjustable volume can also take place by means of other actuators, such as for example a hydraulic cylinder or similar components producing a force path.

Moreover, with a differently set fluid volume, in particular with regard to the first fluid volume chamber 12, different comfort settings can be selected, as is shown in the individual FIGS. 1 to 3.

In the diagram shown in FIG. 1, the controllable piston 17 is set within the add-on-fluid volume controller 5 in such a way that the first fluid volume chamber 12 ideally has a maximum spatial volume. As a result, a maximum suspension comfort can also be ensured.

In the diagram shown in FIG. 2, the controllable piston 17 is set within the add-on-fluid volume controller 5 in such a way that the first fluid volume chamber 12 has a medium spatial volume. As a result, a medium suspension comfort can be ensured.

In the diagram shown in FIG. 3, however, the controllable piston 17 is set within the add-on-fluid volume controller 5 in such a way that the first fluid volume chamber 12 has only a small spatial volume, as a result of which a lower suspension comfort is provided.

For a displacement of the controllable piston 17 to the left and/or right within the add-on-fluid volume controller 5, the pressure equalizing valve 15 can be opened. Particularly in the case of a displacement of the controllable piston 17 to the right within the add-on-fluid volume controller 5, the shut-off valve 11 is best closed briefly so that only the two fluid volume chambers 12 and 13 are fluidically coupled to one another.

A spatial volume of the second fluid volume chamber 13 accordingly depends on the spatial volume of the first fluid volume chamber 12.

Other control, regulating and/or measuring devices, such as, for example, acceleration sensors and position sensors of the present device are not additionally shown for the sake of clarity.

Figure 4:
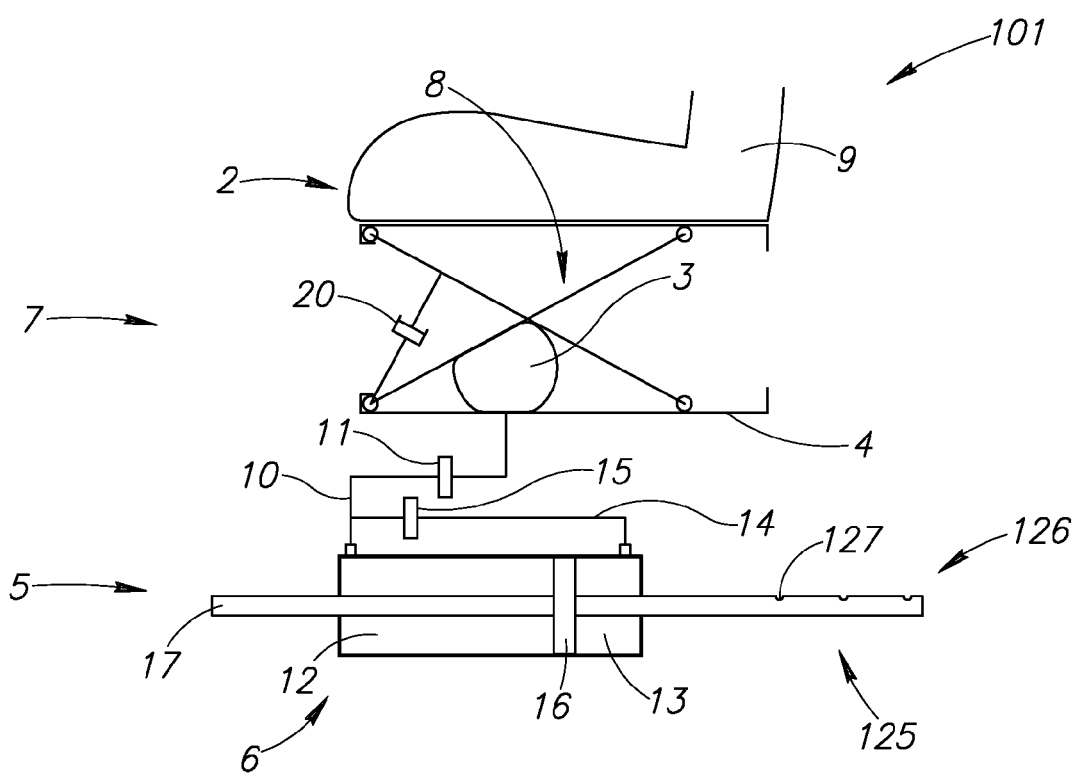
FIG. 4 schematically shows a view of a second exemplary embodiment of a device for springing a mass in the form of a seat device comprising a fluid spring in conjunction with an add-on-fluid volume controller that can be adjusted in three stages in a first stage with maximum comfort.
Figure 5:
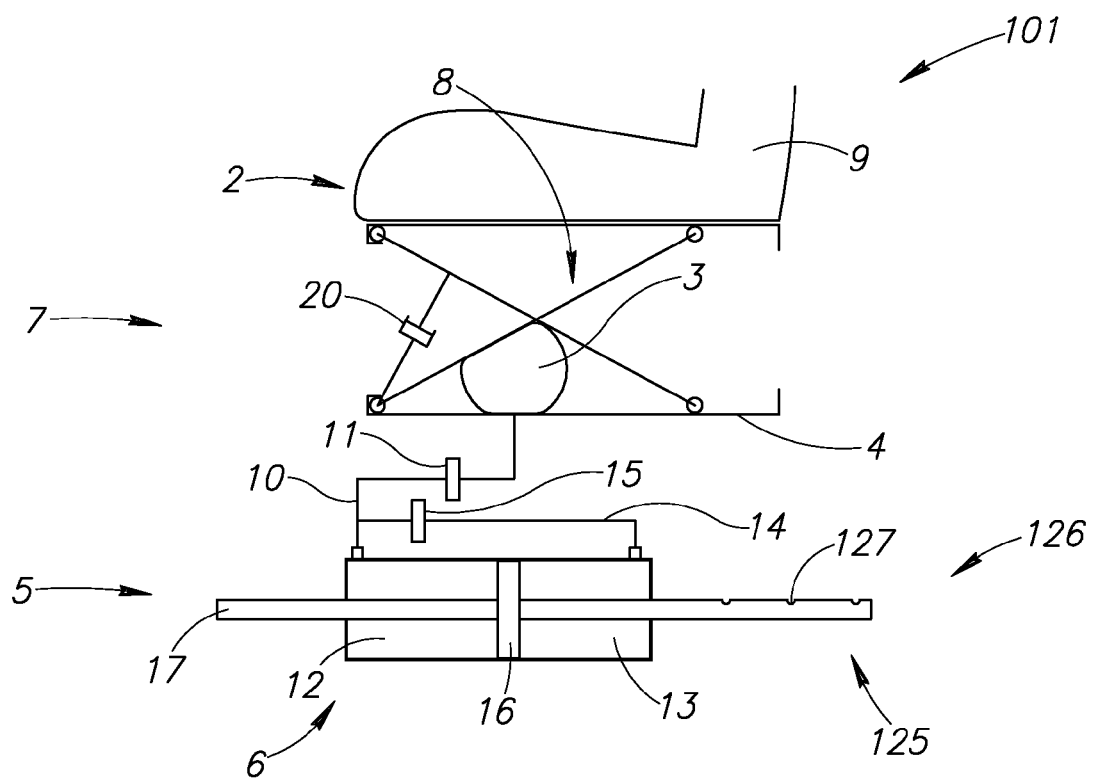
FIG. 5 schematically shows a view of the second exemplary embodiment of FIG. 4 in a second stage with medium comfort.
Figure 6:
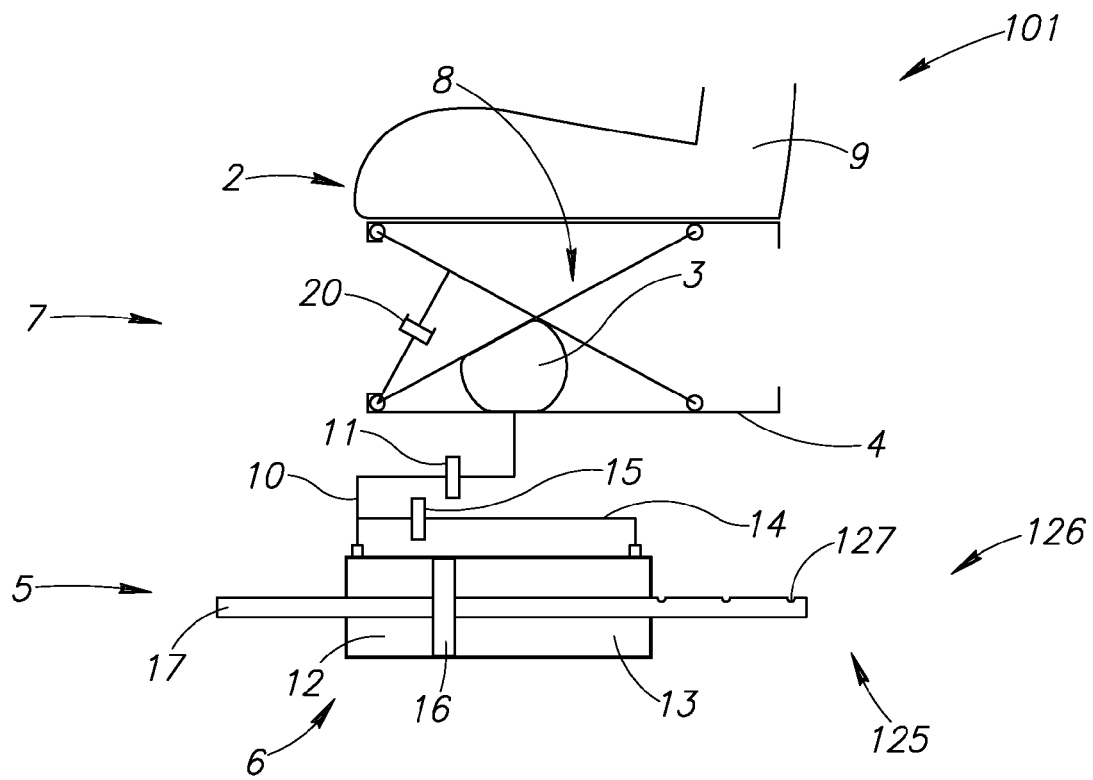
FIG. 6 schematically shows a view of the second exemplary embodiment in a third stage with lower comfort.

The further device 101 for springing a mass 2, said device being shown in FIGS. 4 to 6 as a second exemplary embodiment, is constructed in a manner essentially identical to the device 1 from FIGS. 1 to 3, so that the method thereof is also identical. Similar components and groups of components therefore also bear identical references. In order to avoid repetition, the method operations discussed in detail above are also not described again in connection with the second exemplary embodiment.

In this second exemplary embodiment, the controllable piston 17 of the two-chamber cylinder 19 is formed with three stages as a modification of the first exemplary embodiment. The controllable piston 17 therefore has at its control end 125 three latching markings 126, into which a latching protrusion 127 can latch depending on the selected comfort setting.

In the diagram shown in FIG. 4, the latching protrusion 127 is latched into an inner of the three latching markings 126, so that the controllable piston 17 is set within the add-on-fluid volume controller 5 in such a way that the first fluid volume chamber 12 ideally has a maximum spatial volume. As a result, a maximum suspension comfort can also be ensured.

In the diagram shown in FIG. 5, the latching protrusion 127 is latched into a middle of the three latching markings 126, as a result of which the controllable piston 17 can be set within the in such a way that the first fluid volume chamber 12 has a medium spatial volume. A medium suspension comfort can thus be ensured.

In the diagram shown in FIG. 6, the latching protrusion 127 is latched into an outer of the three latching markings 126. The controllable piston 17 is therefore set in such a way that the first fluid volume chamber 12 has a small spatial volume, as a result of which a lower suspension comfort is preset.

Figure 7:
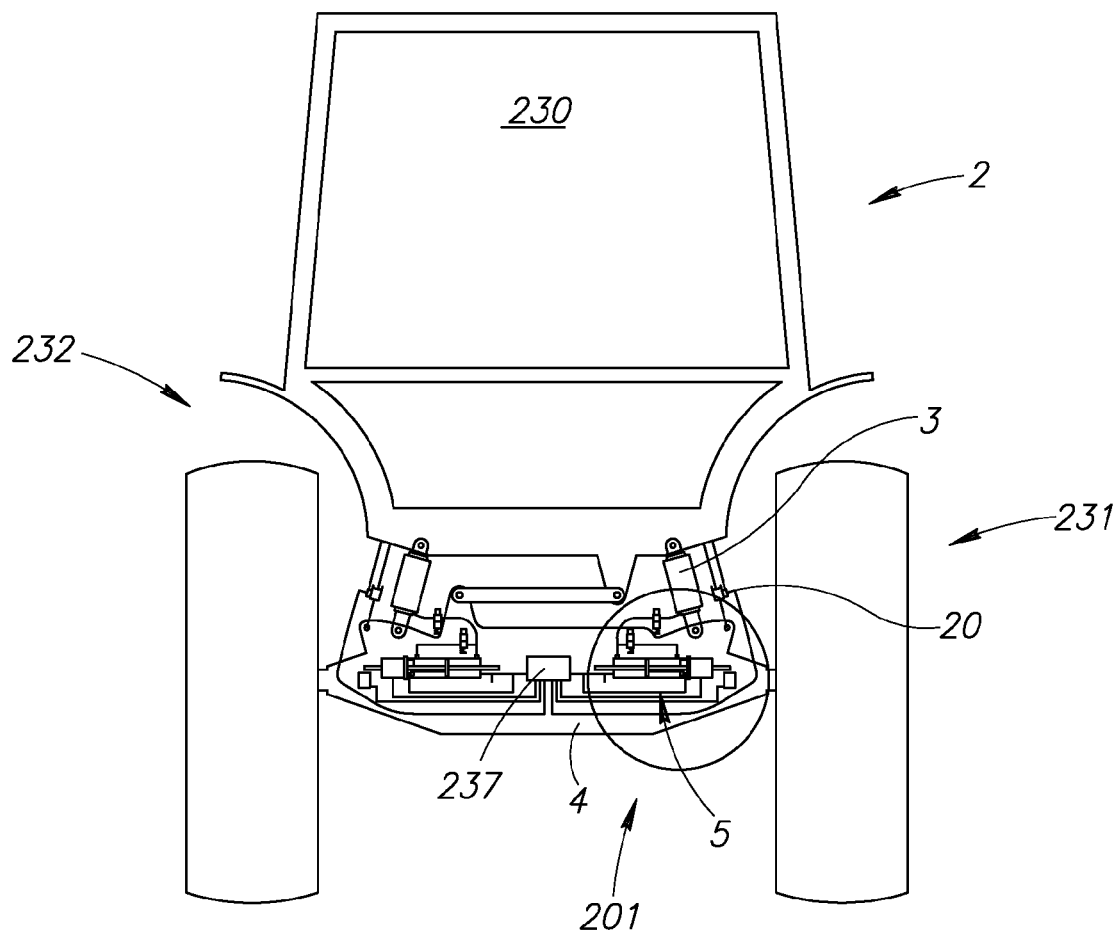
FIG. 7 schematically shows a view of a further exemplary embodiment with two devices for springing a mass in the form of a utility vehicle cab in conjunction with an add-on-fluid volume controller.
Figure 8:
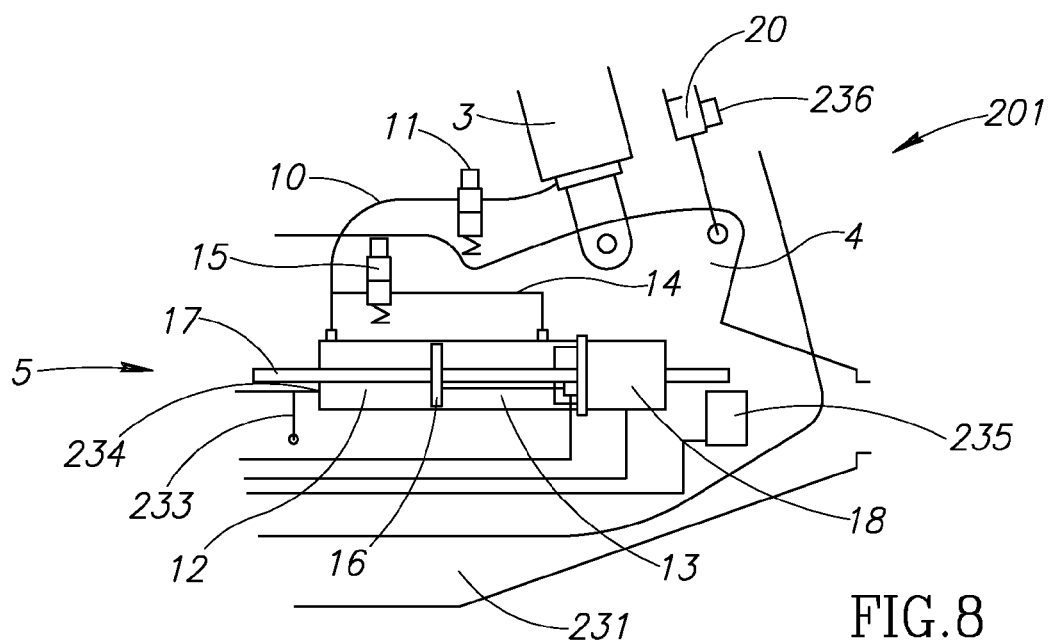
FIG. 8 schematically shows a detail view of one of the springing devices from FIG. 7.

In the third exemplary embodiment shown in FIGS. 7 and 8, the mass 2 to be sprung in the case of the alternative device 201 shown therein is embodied essentially as a vehicle cab 230. The alternative device 201 therefore differs essentially by the differently embodied mass 2, in particular relative to the first example of embodiment, and therefore also the method with regard to the alternative device 201 is identical. For these reasons, similar components and groups of components also bear identical references. In order to avoid repetitions here too, the method operations discussed in detail above are also not described again in connection with the third example of embodiment.

The frame 4 is embodied here as the chassis 231 of a utility vehicle 232. The device 201 is provided twice in this example of embodiment, but will be explained essentially on the basis of the detail view shown in FIG. 8. The device 201 can in this case be used in particular to actively reduce the vibration exposure in the cab region and also to control the level and to actively support against rocking movements.

Here too, the fluid spring 3 is connected to the add-on-fluid volume controller 5 by means of a fluid line 10 which comprises a shut-off valve 11. The add-on-fluid volume controller 5 comprises two fluid volume chambers 12 and 13 and a controllable piston 17 with a piston bottom which is provided as a common, displaceable chamber wall 16. By means of the actuator 18, the piston 17 can be continuously moved, as a result of which the fluid volume chambers 12 and 13 can be set to different sizes. The two fluid volume chambers 12 and 13 can also be fluidically connected to one another here, for which reason there is provided a suitable fluid connection 14 with an integrated pressure equalizing valve 15.

In an alternative embodiment, the invention further includes an air pressure supply 233 with a control valve 234, a 3D acceleration sensor 235 on the chassis 231, for example, a first position sensor 236 in the region of the damper 20, and a control unit ECU 237, by means of which all the determined data can be evaluated and used accordingly.

It will be understood that the examples of embodiments discussed above describe merely first uses and the device according to the invention can also provide differently constructed suspension systems. All of the features disclosed in the application documents are claimed as essential to the invention in so far as they are novel individually or in combination with respect to the prior art.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. An apparatus for springing a mass, comprising:
    a fluid spring and a frame, wherein the fluid spring is arranged between the mass and the frame in such a way that the mass is mounted on the frame in at least one of a sprung or damped manner;
    a fluid volume controller configured to modify the fluid volume to the fluid spring, wherein the fluid volume controller comprises at least two fluid volume chambers configured to be fluidically connected to one another and which have at least one common, displaceable chamber wall; and
    an actuated piston defining the common, displaceable chamber wall, wherein the at least two fluid volume chambers of the fluid volume controller are separated by the actuated piston; and
    a shut-off valve interposed between the fluid spring and a first volume chamber of the fluid volume controller;
    a pressure equalizing valve
    wherein the apparatus is configured to adjust the common, displaceable chamber wall and to both fluidically connect the at least two fluid volume chambers to one another via the pressure equalizing valve and close the shut-off valve during adjustment of the common, displaceable chamber wall.

2. The apparatus according to claim 1, wherein the at least two fluid volume chambers of the fluid volume controller are adjustable with regard to their fluid volume.

3. The apparatus according to claim 1, wherein the fluid volume controller comprises a two-chamber cylinder with said actuated piston.

4. The apparatus according to claim 1, wherein the fluid volume controller comprises an actuator for adjusting a fluid volume of at least two of the fluid volume chambers.

5. The apparatus according to claim 1, wherein the fluid volume controller comprises an actuator for displacing the actuated piston of the fluid volume controller.

6. The apparatus according to claim 1, wherein the mass comprises a body component of a vehicle.

7. The apparatus according to claim 1, wherein the mass comprises a movable part of a seat.

8. The apparatus according to claim 1, wherein the fluid spring is coupled to a scissors control arm of a seat.

9. The apparatus according to claim 1, wherein the mass is a vehicle seat.

10. An apparatus for springing a mass, comprising:
    a fluid spring and a frame, wherein the fluid spring is arranged between the mass and the frame in such a way that the mass is mounted on the frame in at least one of a sprung or damped manner;
    an add-on-fluid volume means for providing an additional fluid volume for the fluid spring, the add-on-fluid volume means comprising at least two fluid volume chambers that can be fluidically connected to one another and which have at least one common, displaceable chamber wall,
    an actuated piston, wherein the common, displaceable chamber wall is defined by the actuated piston, and wherein the at least two fluid volume chambers of the add-on-fluid volume means are separated by the piston; and
    a shut-off valve interposed between the fluid spring and a first volume chamber of the at least two fluid chambers, the shut-off valve further operatively coupled to the fluid volume controller;
    a pressure equalizing valve;
    wherein the apparatus is configured to adjust the displaceable chamber wall and to both fluidically connect the at least two fluid volume chambers to one another via the pressure equalizing valve and close the shut-off valve during adjustment of the displaceable fluid wall.

11. The apparatus according to claim 10, wherein the at least two fluid volume chambers of the add-on-fluid volume means are adjustable with regard to their fluid volume.

12. The apparatus according to claim 10, wherein the add-on-fluid volume means comprises a two-chamber cylinder.

13. The apparatus according to claim 10, wherein the add-on-fluid volume means comprises an actuator for adjusting the fluid volumes of at least two of the fluid volume chambers.

14. The apparatus according to claim 10, wherein the add-on-fluid volume means comprises an actuator for displacing the common, displaceable chamber wall of the two fluid volume chambers of the add-on-fluid volume means.

15. The apparatus according to claim 10, wherein the mass comprises a body component of a vehicle.

16. The apparatus according to claim 10, wherein the mass comprises a movable part of a seat.

17. The apparatus according to claim 10, wherein the fluid spring is coupled to a scissors control arm of a seat.

18. A method for manipulating a fluid spring comprising:
fluidically connecting the fluid spring to a fluid volume chamber of a plurality of fluid volume chambers, the plurality of volume chambers being separated by an actuated piston;
manipulating the fluid spring by selectively connecting the plurality of fluid volume chambers to one another and adjusting the actuated piston;
manipulating a shut-off valve interposed between the fluid spring and a first volume chamber of the plurality of fluid volume chambers;
adjusting the actuated piston and, during actuation of the piston, both of a) fluidically connecting the plurality of volume chambers to one another and b) closing the shut-off valve; and
leaving the shut-off valve open other than during adjustment of the piston.

19. The method according to claim 18, further comprising:
determining at least one characteristic operating value on a suspension system associated with the fluid spring; and
modifying the fluid volume in at least two of the plurality of fluid volume chambers based on the determined at least one characteristic operating value.

\* \* \* \* \*